United States Patent

Reibl

Patent Number: 5,790,911
Date of Patent: Aug. 4, 1998

[54] FLAT FILM CASSETTE FOR COMPACT PHOTOGRAPHIC CAMERA

[75] Inventor: Michael Reibl, Stuttgart, Germany

[73] Assignee: Eastman Kodak Company, Rochester, N.Y.

[21] Appl. No.: 856,714

[22] Filed: May 15, 1997

[30] Foreign Application Priority Data

Jun. 10, 1996 [DE] Germany ............ 196 23 066.7
Jun. 10, 1996 [DE] Germany ............ 196 23 067.5

[51] Int. Cl.$^6$ .................................. G03B 17/26
[52] U.S. Cl. ............................ 396/511; 396/414
[58] Field of Search ......................... 396/335, 348, 396/395, 414, 416, 511, 512, 517, 535, 536, 538, 541

[56] References Cited

U.S. PATENT DOCUMENTS 1,191,632  7/1916  Whatley .................... 396/414
1,213,694  1/1917  Schultz, Sr. ................ 396/414
4,340,288  7/1982  Stemme et al. .

FOREIGN PATENT DOCUMENTS 30 19 307 A 1  5/1980  German Dem. Rep. .

Primary Examiner—Howard B. Blankenship
Attorney, Agent, or Firm—Robert Luke Walker

[57] ABSTRACT

A photographic camera of small, flat design, comprising a body shell, a taking lens, a viewfinder, a film chamber, a film transport apparatus, and a flash device. The body shell is configured parallelepipedally and has on its front side a linear flat guideway in which a lens slide is guided displaceably from a non-operating position into a taking position and for purposes of film transport. For this purpose the body shell is equipped on the back side with a linear flat guideway, and the film chamber is configured as a replaceable film cassette that is displaceably guided in the flat guideway. The film cassette serves to receive a film strip equipped with an edge perforation, and consists of a flat, parallelepipedal housing with an exposure window and a film mouth. There extends in the housing, in the longitudinal direction thereof, a circumferential and continuous film channel which passes by the exposure window and opens into the film mouth.

20 Claims, 9 Drawing Sheets

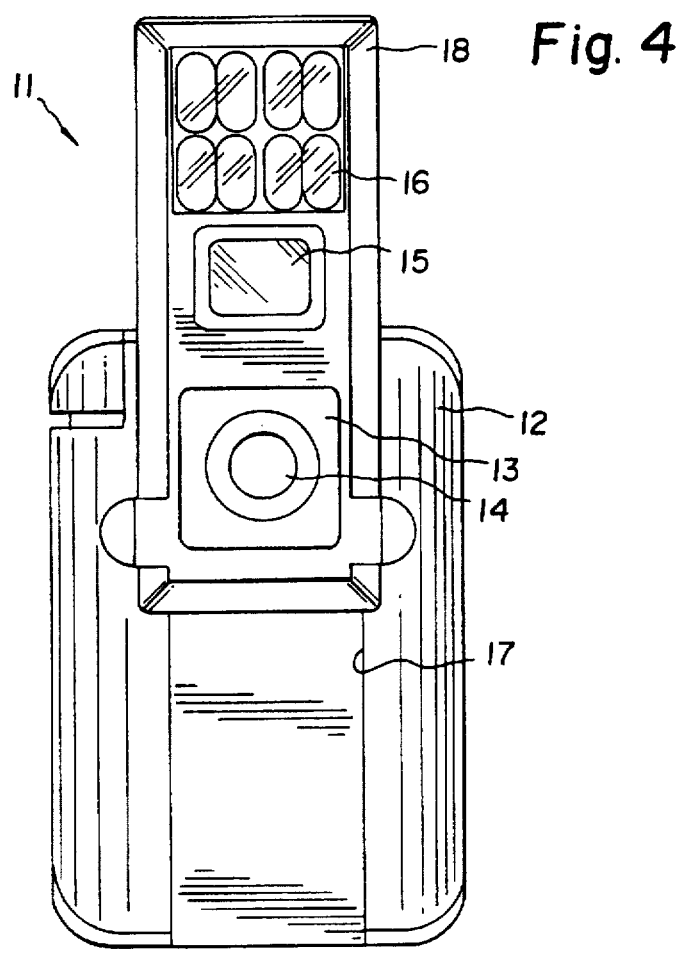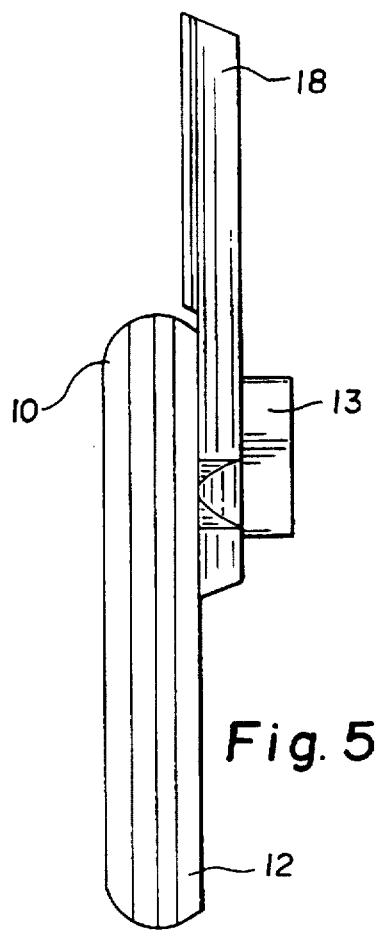

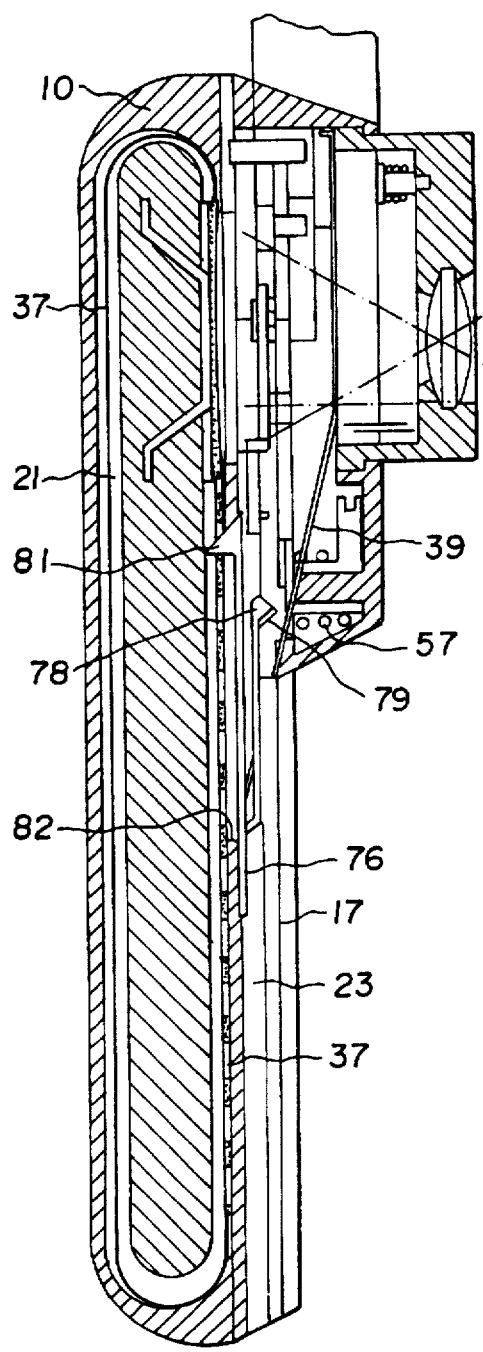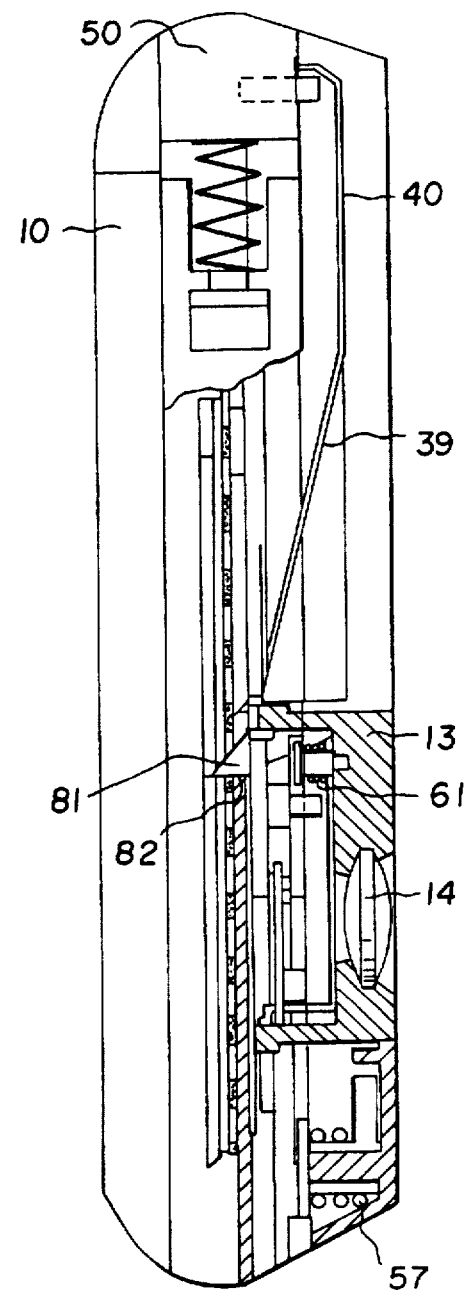
FIG. 13
FIG. 14

FIG. 17
FIG. 18
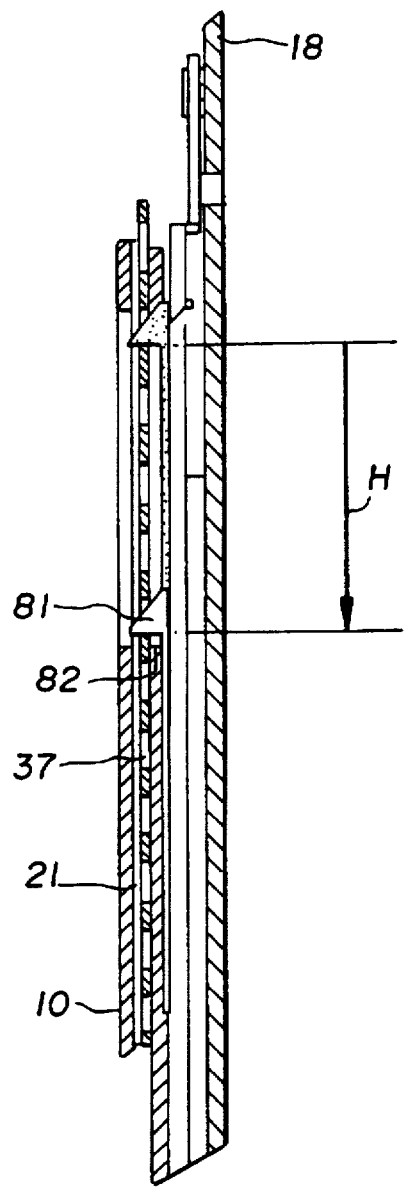
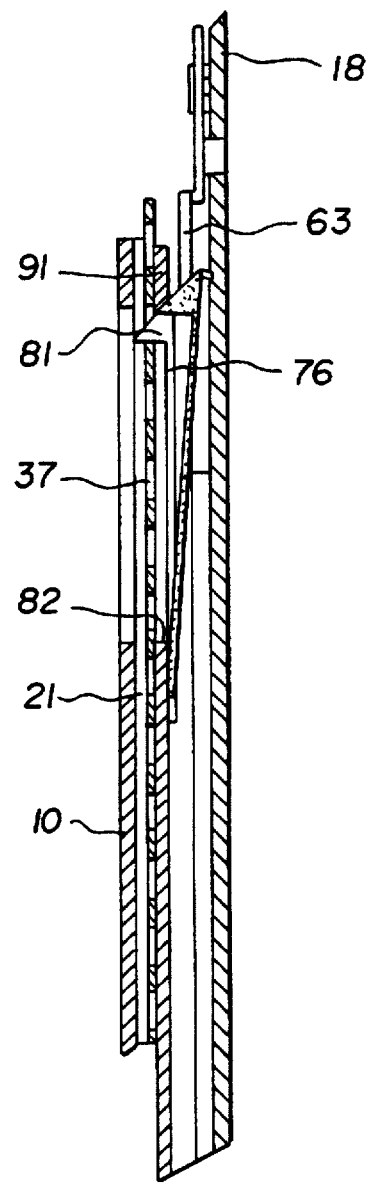

FLAT FILM CASSETTE FOR COMPACT PHOTOGRAPHIC CAMERA

FIELD OF THE INVENTION

The invention relates to photographic film cassettes. More particularly, the invention relates to flattened film cassettes for use in small, photographic cameras.

BACKGROUND OF THE INVENTION

In the field of photographic cameras there is a clear trend toward the construction of small, high-performance cameras. In known cameras of this kind, the film to be exposed is accommodated as film strips lying flat in flat cassettes. The small number of frames that can be accommodated on the film strips is a disadvantage. This disadvantage can be mitigated with the use of the "half-frame" format, i.e. a dimension of 24×18 mm per frame for a 135 film format, but this format still remains unsatisfactory.

A camera of this kind is known from German published application 30 19 307. This document discloses a photographic camera with a lens, an image stage, and a rear cover, and uses a flat, pocket-like film cassette which contains a light-sensitive film strip, suitable for taking a plurality of pictures, that can be moved out of and into the cassette through a film mouth provided on one narrow side of the cassette. A cassette space is provided between the camera rear cover and a cassette support configured on a camera body shell. A film receiving space is arranged parallel to this structure, between the surface of the camera body shell parallel to the cassette support and a wall of the camera housing lying opposite to the camera rear cover and comprising the lens and image stage. The film transport apparatus is mounted on the camera body in the region of extension of the cassette supports and comprises a perforation gear with two rows of teeth.

More specifically with respect to the film cassettes of the pocket-like configuration, known film cassettes of this design are configured so that they can receive a film strip only as a linear film section. A film cassette of this kind is described in DE-OS 2 901 104. The natural result is that only a few picture areas can be accommodated on the film section, since the length of the film cassette cannot be of any dimension. Since in the camera design, there is presently a trend toward very small, pocket-size cameras, which nevertheless are intended to supply a sufficient number of pictures per film, the known cassettes are not necessary satisfactory. Also now in demand are cameras that, after complete exposure of a film strip, are unloaded by the finisher in order to develop the film strip and then reloaded by the camera manufacturer with an unexposed film strip in order to resell the camera. Camera concepts of this kind require new configurations for film cassettes and cameras.

SUMMARY OF THE INVENTION

It is a feature of the invention to create a film cassette for a camera of a type that is of simple design and easy to operate, operates reliably, and despite its small dimensions accepts a film strip of sufficient length for a larger number of frames.

It is a further feature of the invention to configure a film cassette that can be attached in conveniently replaceable fashion to a camera of small, flat design, and that has a film strip with at least eight frames.

According to an aspect of the invention, the film cassette is usable with a camera having a body shell configured parallelepipedally; having a front side on which a linear flat guideway is located, in which guideway a lens slide is guided displaceably from a non-operating position to a taking position, and has a back side in which a film chamber is located.

In a preferred embodiment, the film cassette is usable with a camera in which the body shell also has a linear flat guideway on the back side, and the film chamber is configured as the film cassette that is replaceable and displaceably guided in the flat guideway.

In a further aspect, the lens slide of the camera, which is displaceable from the non-operating position into the taking position, is snap-locked into the latter, and in this taking position, the viewfinder is uncovered and the lens is also in its taking position.

In still a further aspect, a lens carrier receiving the lens of the camera, is guided in the lens slide perpendicular to the movement direction of the lens slide, and is movable from a non-operating position into a taking position and vice versa.

In a particularly advantageous embodiment, the film cassette is provided to receive a film strip equipped with an edge perforation, and comprises a flat, parallelepipedal housing with an exposure window and a film mouth, and is characterized in that configured in the housing is a circumferential, continuous film channel extending in the longitudinal direction thereof, which passes by the exposure window and opens into the film mouth.

In a further aspect, the film channel comprises two straight sections extending parallel to one another having ends connected by semicircular sections.

In still a further aspect, since the film cassette is configured in this manner, the film cassette has a very flat design and can therefore receive a film strip of considerable length on which eight to twelve frames are accommodated in half-frame format, i.e., 18×24 mm.

In a still more specific aspect, the film cassette is advantageously shaped in such a way that the film channel is constituted by the outer walls and semicircular wall sections of the housing, and a web configured in the housing.

Surprisingly, in the aforedescribed film cassette, a film strip can easily follow the contour of the channel in the semicircular sections of the film channel without being blocked or damaged in its movement within the film channel, despite the relatively small radius of the web ends. This applies in particular to the Advanced Photo System (APS) films just coming onto the market.

In a further embodiment of the film cassette, the film mouth is arranged in a region in which a semicircular wall section meets an outer wall of the film cassette.

In still a further embodiment, the one semicircular wall section remains joined to the one outer wall, but is arranged separately from the opposite outer wall, this elastic tongue-like wall section resting with its free end against the outer wall under resilient preload, and forming the film mouth.

In still a further embodiment, the elastic tongue-like configuration of the semicircular wall section creates a simple and reliable capability of automatically inserting the film strip into the film cassette, and pulling it back out by means of a gripper after exposure.

In still a further embodiment, for previous purpose, the U-shaped transfer shoe that is flat in cross-section is provided, such that it can be inserted and pulled out between the outer wall and the elastic tongue-like semicircular wall section.

BRIEF DESCRIPTION OF THE DRAWINGS

Further features and advantages are evident from the description of an exemplified embodiment of the invention and from the further subclaims. In the drawings:

FIG. 4 shows the camera according to FIG. 1, ready to operate, in a front view;

FIG. 5 shows the camera according to FIG. 4 in a side view;

FIG. 13 shows the camera according to FIG. 4 in an enlarged depiction in a side view in section;

FIG. 14 shows the camera according to FIG. 1 in an enlarged depiction in partial section;

FIG. 17 shows a detail of the camera according to FIG. 1 in an enlarged depiction in section; and FIG. 18 shows a detail of the camera according to FIG. 1 in an enlarged depiction in section.

DETAILED DESCRIPTION THE CAMERA STRUCTURE - FIGS. 1–6 AND 11–18

Figure 1:
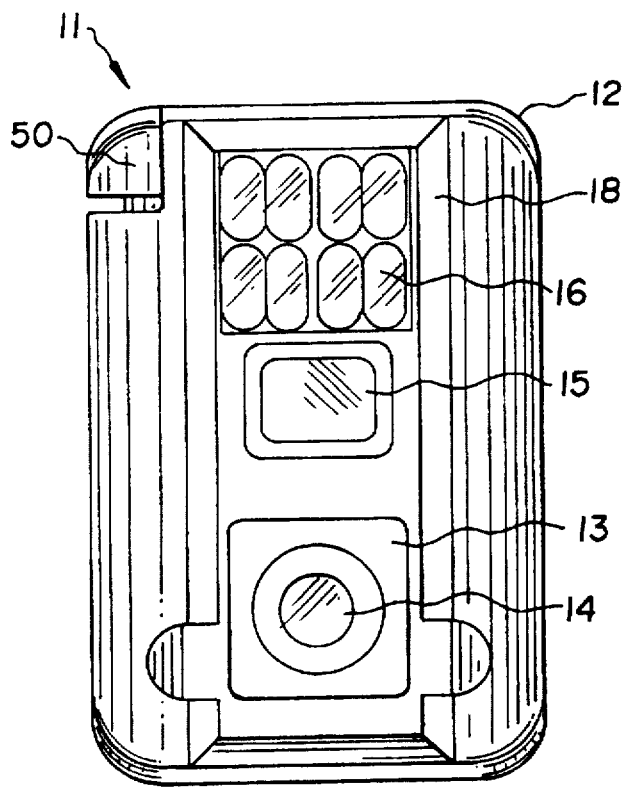
FIG. 1 shows the camera for use with the film cassette of the invention, not ready to operate, in a front view.

Subminiature camera 11 illustrated in the drawings consists of a flat body shell 12 on whose front side a lens slide 18 with a lens carrier 13 is slidable in a flat guideway 17 from a non-operating position into a taking position. A lens 14 is set into lens carrier 13. A viewfinder 15 and a flash arrangement 16 are provided in lens slide 18. Lens carrier 13 is pretensioned in lens slide 18, by means of a return spring 19, against a housing-side ramp 39 and a support surface 40.

On the back side of subminiature camera 11, film cassette 10 is guided, again by means of a flat guideway 23, in body shell 12 so as to slide in and out, and is held in its end positions. The configuration of film cassette 10 will be described in further detail following the description of the construction of the camera.

On the right side of camera 11, a release button 50 is guided longitudinally displaceably parallel to lens slide 18 against the force of a return spring 51. Release button 50 engages with a projection 52 on one arm 53 of a two-armed release pawl 54 mounted pivotedly in lens slide 18, when lens slide 18 is in its taking position. The other arm 55 of release pawl 54 is braced against a surface 56 of an impact lever 58 that is preloaded by a drive spring 57. Impact lever 58 rests with an impact arm 59 against a shutter blade 60 that is held, under the preload of a torsion spring 61, in its closed position in front of lens 14. The impact lever has a cam 62 whose purpose will be described later.

A retaining lever 63, which is braced elastically on arm 55 by means of a lobe 64, is mounted pivotedly in lens slide 18 parallel to arm 55 of release pawl 54.

Also mounted on release button 50 is a counter lever 65, which is guided displaceably in body shell 12 in a pin-and-oblong-hole guide and engages in springloaded fashion, with a pawl 66 configured at its free end, into the teeth of a counter bar 67. In the exemplified embodiment, counter bar 67 is designed with eight teeth for eight photographic images, and equipped accordingly with the digits 8 to 1 to count the remaining pictures. A stop 68 delimits movement after the eighth picture is taken, and a compression spring returns counter bar 67 to its zero position. A hook 74, provided on counter lever 65 and interacting with a gate 80 on film cassette 10, serves to disengage the latter from the teeth of counter bar 67 when film cassette 10 is changed.

In addition, a detent pawl 70, which on the one hand engages with a pawl-shaped lug 71 into the teeth of counter bar 67 and on the other hand lies with an end surface 72 at a short distance opposite the side surface of lens slide 18, is mounted pivotedly in body shell 12. With lens slide 18 in either the non-operating or the taking position, there is thus located opposite end surface 72 a cutout 93 or 73 present in the side surface thereof, into which end surface 72 penetrates when film cassette 10 is changed. For this purpose, a hook 75 which cooperates with gate 80 on film cassette 10 is also provided on detent pawl 70.

Furthermore a film gripper 76, which engages by means of a spring arm 77 and a snap ball 78 arranged at its free end into a snap recess 79 configured on lens slide 18, is guided so as to be displaced longitudinally with lens slide 18 in body shell 12. This engagement persists so long as lens slide 18 is moved only for the purpose of film transport after a picture has been taken. Only when lens slide 18 is slid back into its non-operating position does this snap connection 78/79 release and film gripper 76 remain in a position in which film gripper 76 comes into contact with its gripper tooth 81 against a stop shoulder 82 configured in film cassette 10.

A stop 83 that, for purposes of shutter cocking, interacts with cam 62 of impact lever 58, is provided in body shell 12. This cam 62 additionally actuates flash arrangement 16 when the camera is triggered. For this purpose, after release button 50 is pressed down, cam 82 strikes a retaining pawl 84 which releases a firing spring 85 that strikes a piezo block 86. A flash lamp is fired via electrical lines 87 that end in a socket 88 of flash arrangement 16.

Lastly, a leg spring 89, that rests with one leg against body shell 12 and with the other leg, whose end is paddle-shaped, under spring preload against the side wall of lens slide 18 in its non-operating position, is arranged in body shell 12. Configured on lens slide 18 and lying transverse to its movement direction is a shoulder 90 against which leg spring 89 rests with its paddle-shaped end when lens slide 18 is displaced into its taking position, and assists that displacement. In the taking position, leg spring 89 secures the position of lens slide 18.

As mentioned above, the construction and arrangement of film cassette 10 arranged replaceably on body shell 12 will be described below with reference to FIGS. 6–10.

THE FILM CASSETTE STRUCTURE - FIGS. 6–10

According to FIGS. 6–10, film cassette 10 consists of a flat, parallelepipedal housing 20 in which a continuous film channel 21 is provided. Film channel 21 is constituted by two longitudinal sections 21a and 21b extending parallel to one another, as well as semicircular sections 21c and 21d joining their ends.

Parallel to section 21 a of film channel 21, housing 20 has an outer wall 22 in which a flat guideway 23 associated with camera-side flat guideway 17 is configured. Parallel to section 21b of film channel 21, housing 20 has an outer wall 45. In addition, an exposure window 24 communicating with film channel section 21a is present in outer wall 22. Provided between film channel section 21 a and exposure window 24 is a recess 25 extending over the latter, in which a springloaded shutter panel 26 is mounted longitudinally displaceably to close off exposure window 24 when not joined to a camera. A pin 27 that interacts with a camera-side stop in order to open shutter panel 26 is mounted on shutter panel 26. Provided in outer wall 22 of film cassette 10 that faces the camera are two parallel elongated slots 42 which allow a camera-side film gripper 76 to pass through the film perforation of film strip 37 in order to transport it. Pin 27 moves in one of elongated slots 42.

The inner walls of film channel 21 are constituted by a web 28 that, for reasons related to injection molding, is configured as a hollow web. The ends of the web 28 can also be constituted by rotatably mounted rollers having a diameter identical to the thickness of the web.

In order to form a film mouth 44, a wall section 29 of housing 20 is arranged in the region of semicircular film channel section 2 Id, separated from outer wall 22 and configured as a film hinge by the fact that a constriction 30 is provided in that wall section 29. The free end of wall section 29 is configured as a lip and rests, in light-tight fashion and under elastic preload, against a projection 31 of outer wall 22.

Lastly, web 28 is equipped, opposite exposure window 24, with an opening 32. A film pressure spring 33, which is braced on the one hand by means of a pressure plate 34 against the inside of outer wall 22 and on the other hand by means of spring feet 35 in a socket 36 configured in web 28, projects through this opening 32.

In order to introduce an unexposed packaged film strip 37 of predetermined length through film mouth 44 into film cassette 10, a transfer shoe 38 serving as auxiliary tool is introduced between outer wall 22 and film hinge-like wall section 29, the latter deflecting elastically. Film strip 37 is inserted automatically through this transfer shoe 38 into the film channel of cassette 10 until film strip 37 completely fills film channel 21. A tongue 39 configured concentrically at the beginning of the film strips 37 thus lies in a cutout 40 provided at the end of the film strip (see FIG. 9).

When film cassette 10 is attached onto subminiature camera 11, shutter panel 26 is pulled back by pin 27 so that exposure window 24 is open and film strip 37 is protected from incident light only by shutter blade 60.

In the illustrated embodiment, the film cassette 10 is approximately the size of a credit card. When a picture format of 18×24 mm (half-frame format) is selected, at least eight frames can be accommodated on film strip 37, with the wide side of the frame lying perpendicular to the longitudinal direction of the film strip.

Removal of exposed film strip 37 from film cassette 10 is also accomplished automatically through film mouth 44 by the fact that with transfer shoe 38 inserted between outer wall 22 and elastic film hinge-like wall section 29, film strip 37 is grasped in its perforation by means of a gripper hook 41 and pulled out of film cassette 10.

The individual film strips are then adhesively attached to one another with the tongue 39 of one film strip engaging into the cutout 40 of the preceding film strip with the film strips being adhesively attached at that point. Consequently, the beginning of one film strip is adhesively attached to the end of the preceding film strip.

THE CAMERA OPERATION

Figure 2:
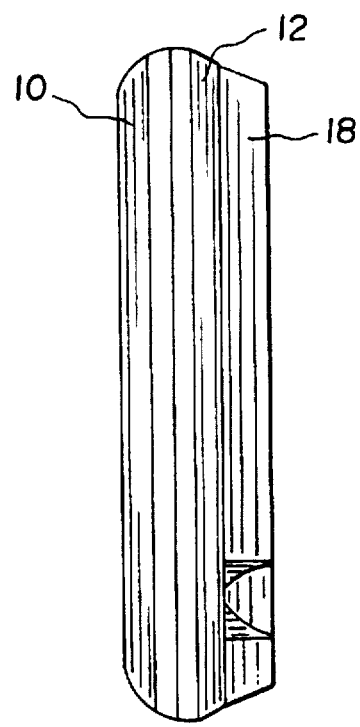
FIG. 2 shows the camera according to FIG. 1 in a side view.
Figure 3:
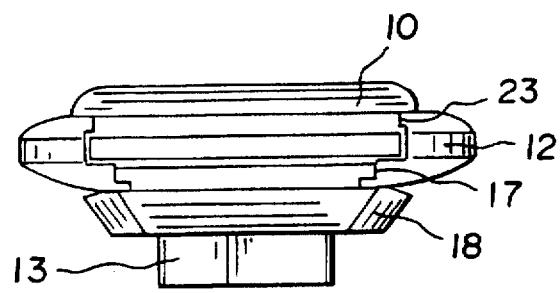
FIG. 3 shows the camera according to FIG. 1 in an end view.
Figure 6:
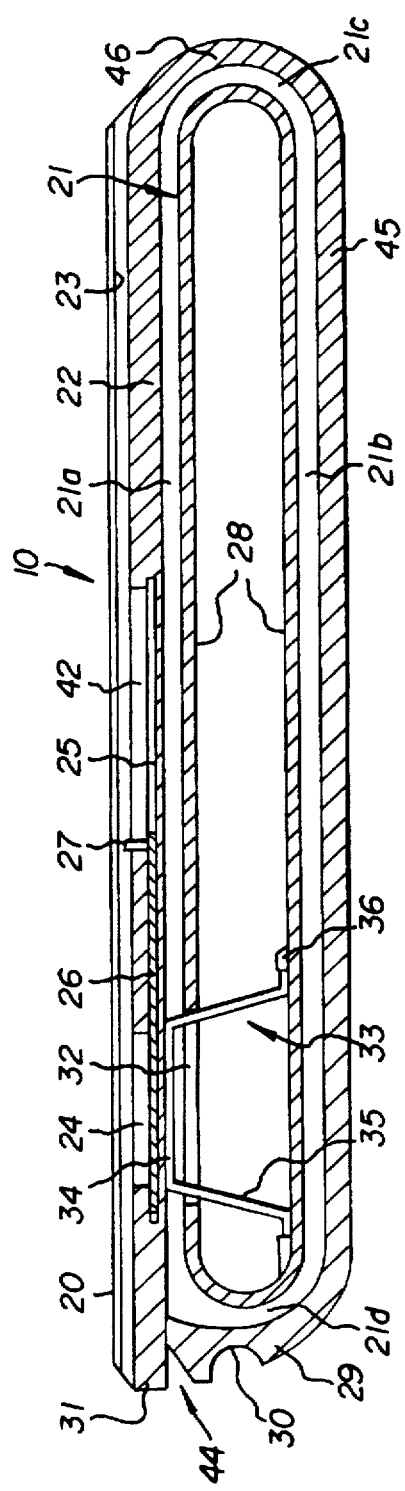
FIG. 6 shows in section the film cassette of the invention for the camera according to FIG. 1.
Figure 7:
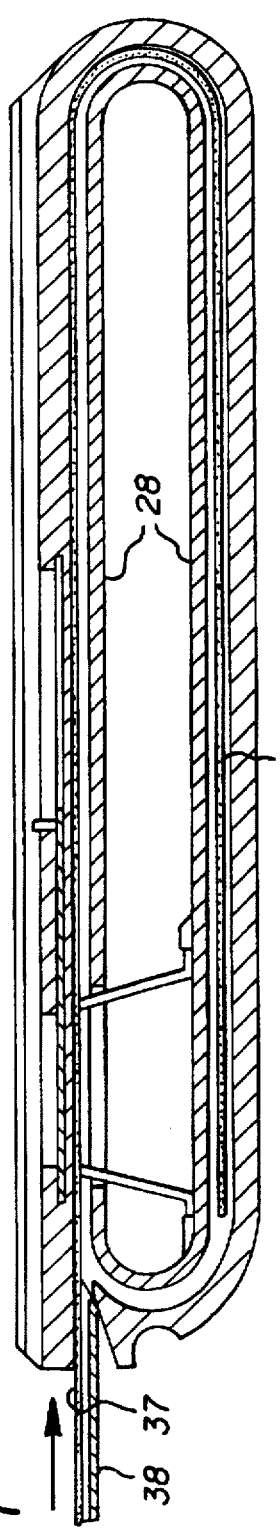
FIG. 7 shows in section the film cassette according to FIG. 6 with the film strip in place.
Figure 8:
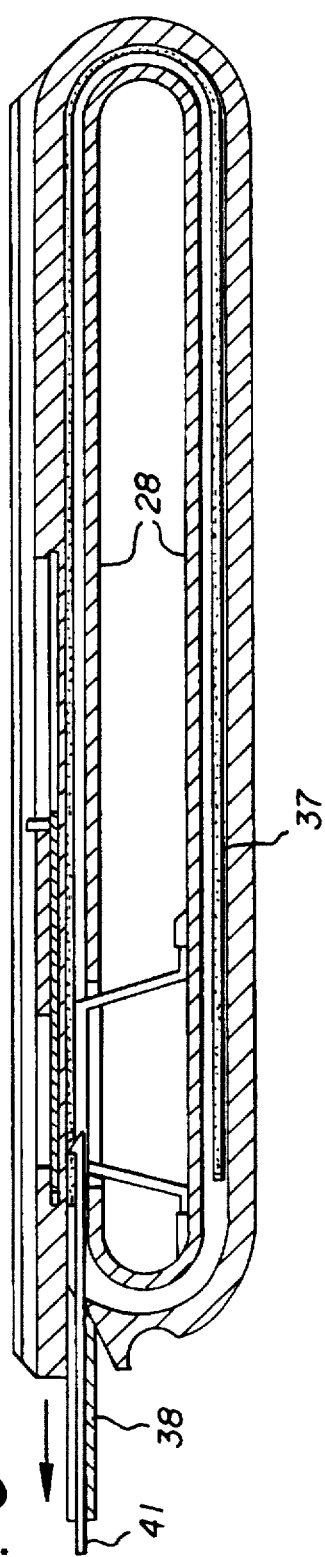
FIG. 8 shows the film cassette according to FIG. 6 with the exposed film strip ready to be pulled out, in longitudinal section.
Figure 9:
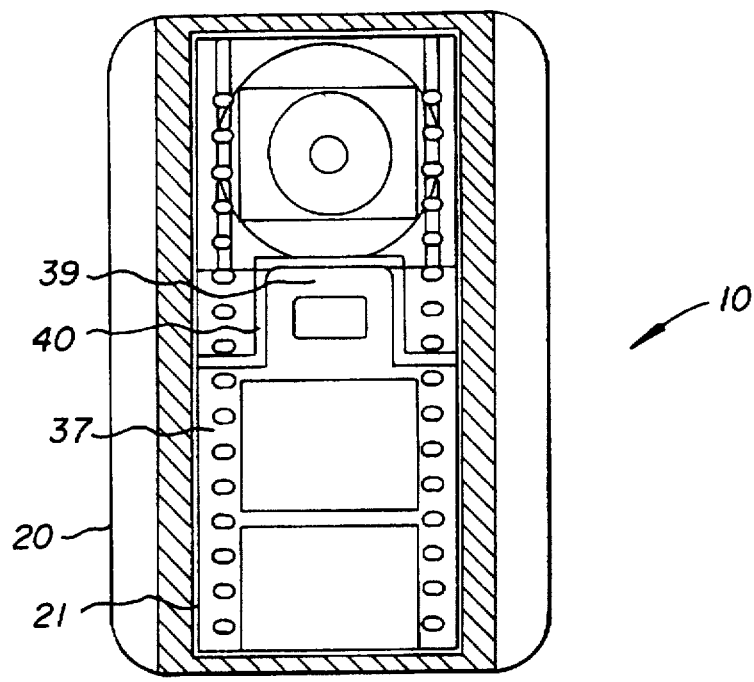
FIG. 9 shows the film cassette according to FIG. 6 with the film strip in place, in a front view partially in section.
Figure 10:
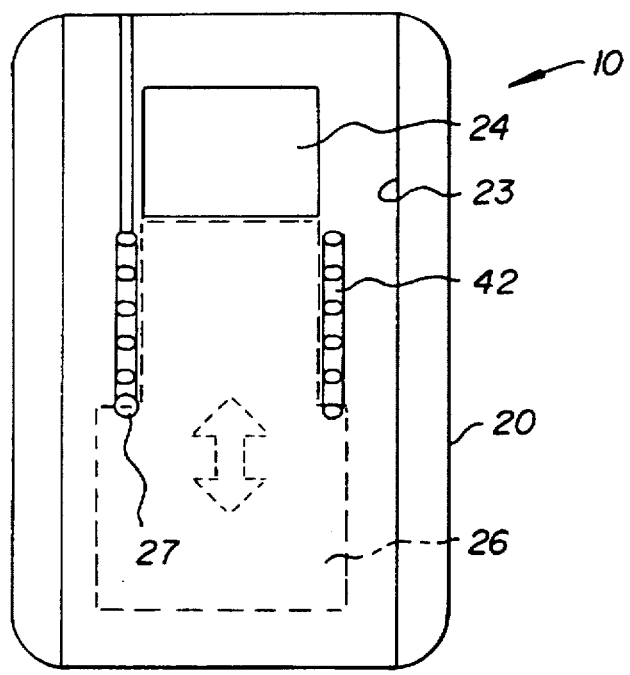
FIG. 10 shows the film cassette according to FIG. 9 in a front view.
Figure 11:
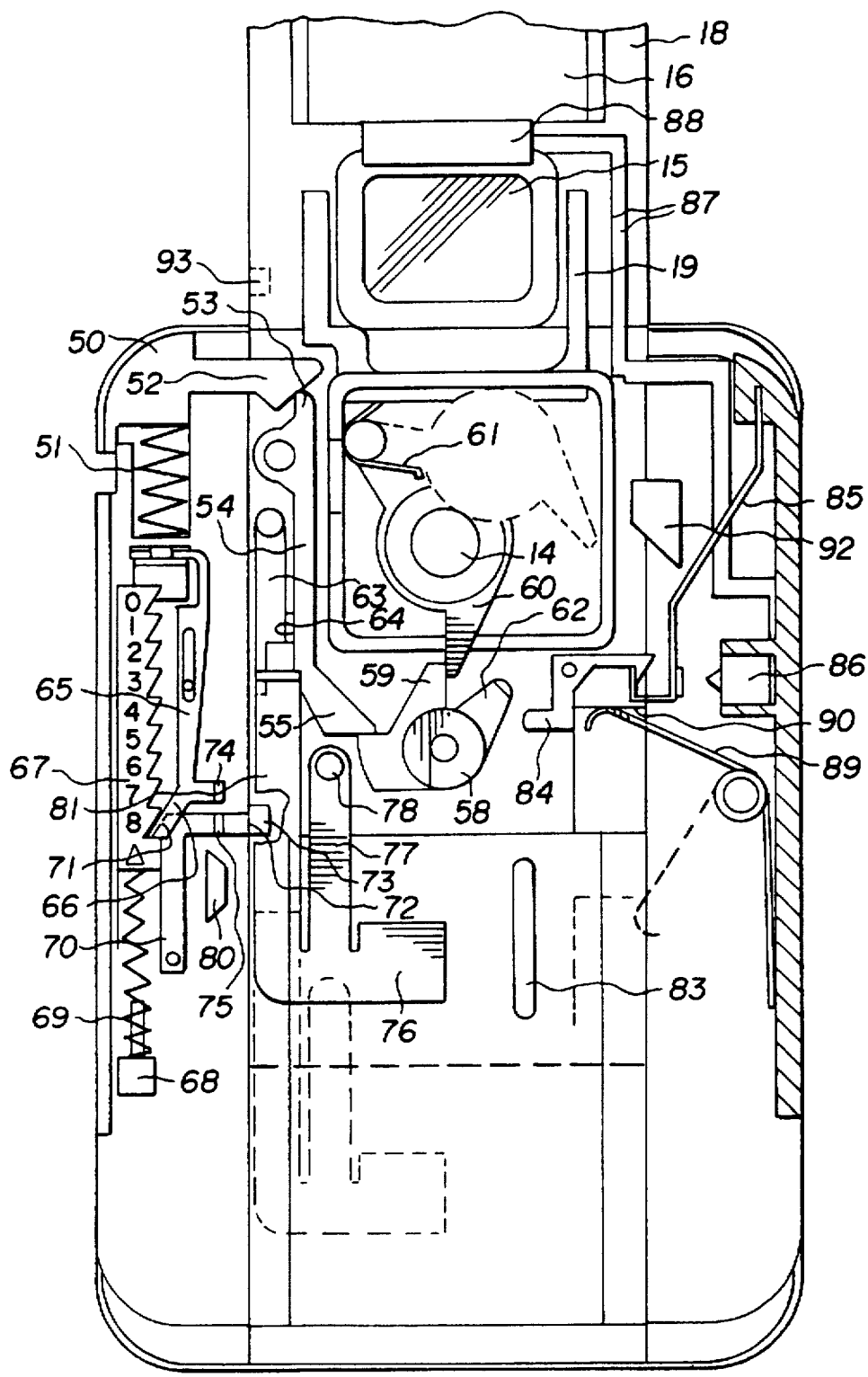
FIG. 11 shows the camera according to FIG. 4 with the front wall removed, in an enlarged depiction in a front view.
Figure 12:
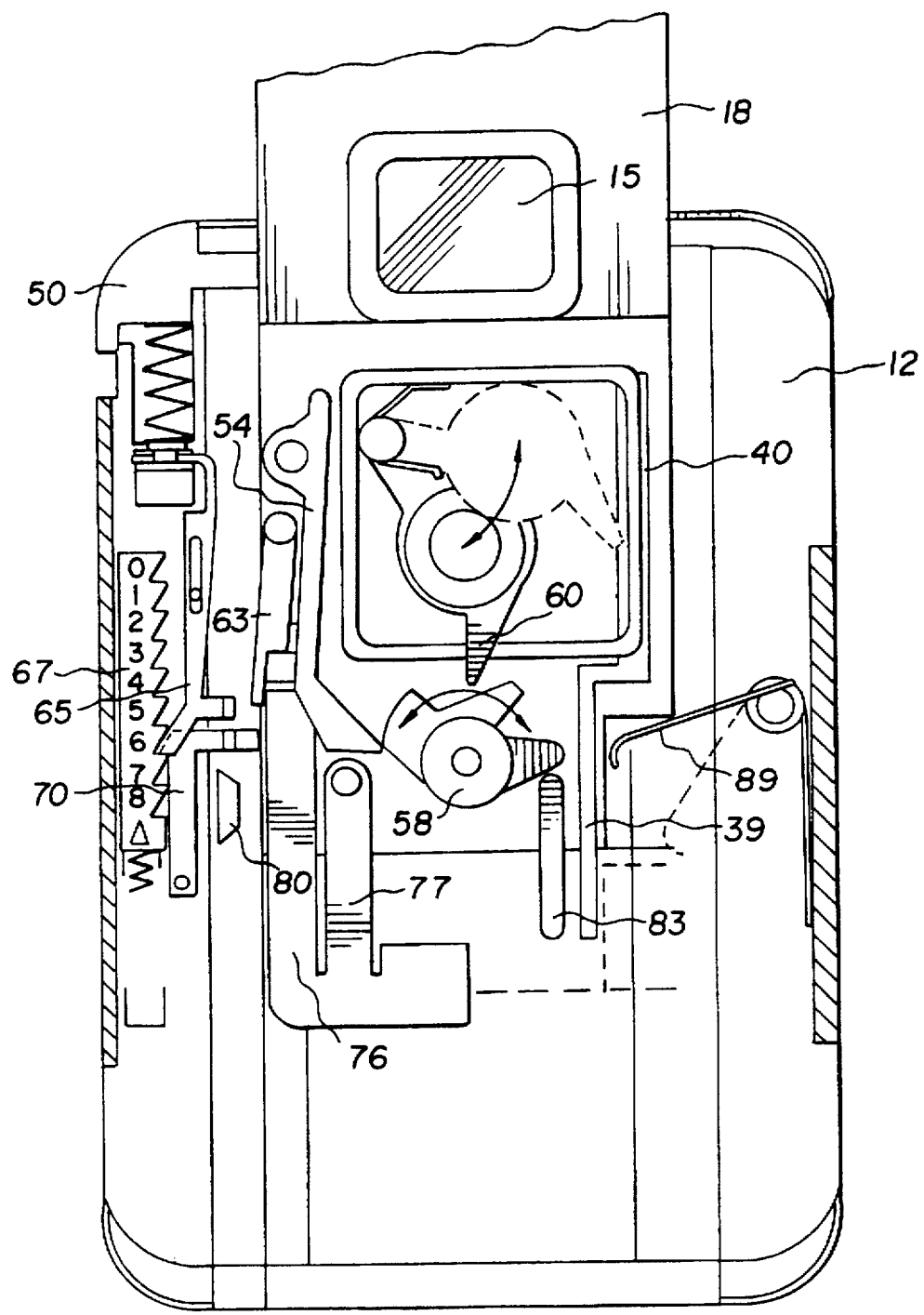
FIG. 12 shows the camera according to FIG. 4 with the front wall removed, after an exposure operation, in an enlarged depiction in a front view.

Lens slide 18 is initially in its non-operating position, and a film cassette 10 loaded with film strip 37 is attached to body shell 12 via flat guideway 23, as depicted in FIGS. 1 to 3.

In order to take a picture, lens slide 18 is displaced manually into its taking position, as depicted in FIGS. 4 and 5.

In the process, leg spring 89, initially resting against the side surface of lens slide 18, passes under shoulder 90 and, as a result of its spring force, assists lens slide 18 in sliding out. At the same time, snap ball 78 of film gripper 76 snaps into snap recess 79 of lens slide 18, and film gripper 76 is carried along (see FIG. 13), its gripper tooth 81 engaging through elongated slot 42 in film cassette 10 and sliding over the perforation of film strip 37. When the taking position has been reached, film gripper 76 is lifted out of the perforation by a slanted surface 91 configured on film cassette 10 and held in that position by retaining lever 63, as shown by FIG. 18.

At the same time, lens carrier 13 mounted in lens slide 18 is brought into its taking position by passing, against the force of return spring 19, over ramp 39 onto support surface 40.

In this condition the camera is ready to take a picture.

In order to take a photograph, release button 50 is pushed down against the force of return spring 5 1. This causes release pawl 54 to be pivoted by projection 52 until arm 55 moves away from surface 56 of impact lever 58, and the latter proceeds clockwise as a result of the force of drive spring 57, opens shutter blade 60 against the force of torsion spring 61, and uncovers lens 14 to expose film strip 37.

At the same time, cam 62 of impact lever 58 runs against retaining pawl 84 and pivots it, so that firing spring 85 strikes piezo block 86 and fires a flash lamp.

The pivoting of release pawl 54 also pivots retaining lever 63 via lobe 64, and releases film gripper 76 so that gripper tooth 81 drops into the film perforation (see FIG. 17).

When release button 50 is pushed down, counter bar 67 is moved one tooth, or one digit, by counter lever 65. In this process, pawl-shaped lug 71 of detent pawl 70 moves one tooth farther as the latter pivots. During pivoting, end surface 72 of detent pawl 70 temporarily penetrates into cutout 73 provided on lens slide 18.

In order to prepare for the next picture, lens slide 18 is displaced toward the non-operating position until gripper tooth 81 strikes against stop shoulder 82 in film cassette 10. Film strip 37 is thereby transported one frame interval H. Film gripper 76 remains in snap-locked engagement with lens slide 18. At the same time cam 62 runs against stop 83, and impact lever 58 is rotated once again into its spring-preloaded cocked position in which it is retained by release pawl 54 that is pivoted back. A return element 92 ensures that firing spring 85 is once again held by retaining pawl 84 in the preloaded firing position.

Retaining lever 63 follows along as release pawl 54 pivots back, so that when lens slide 18 is once again in the taking position, gripper tooth 81 of film gripper 76 is lifted away from the film perforation by means of slanted surface 91. If no picture is taken in this position, but instead lens slide 18 is displaced into the non-operating position, film strip 37 is not transported.

If a further picture is taken, the operations again proceed as described.

Figure 15:
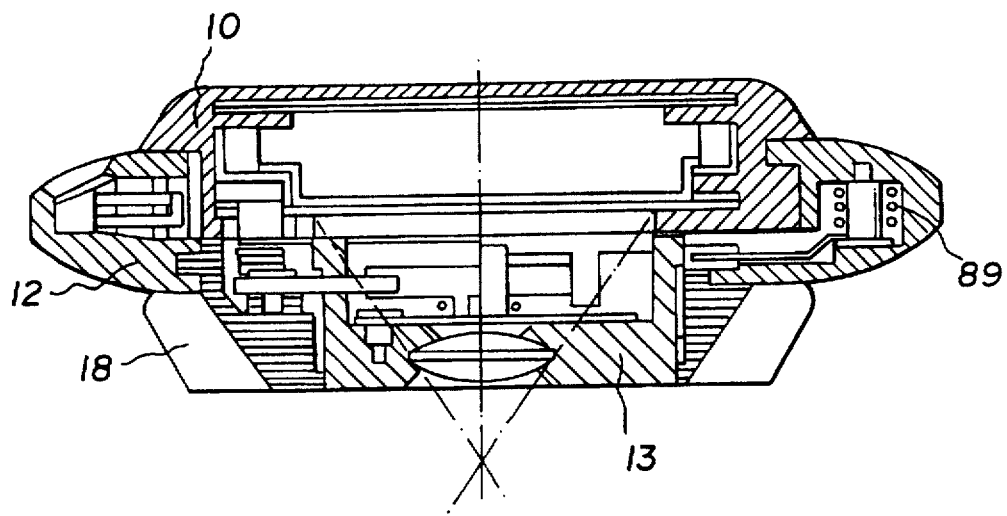
FIG. 15 shows the camera according to FIG. 14 in a plan view in section.
Figure 16:
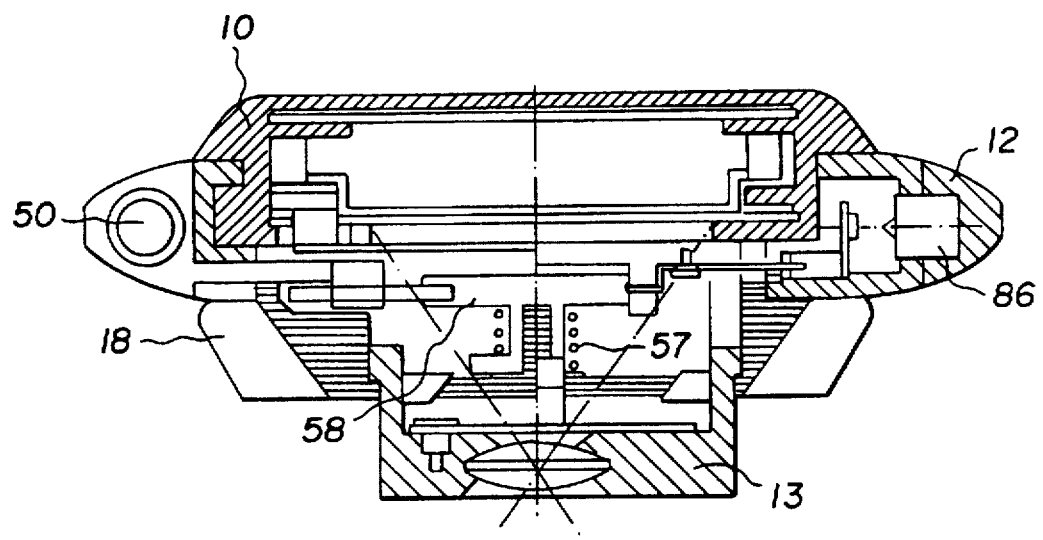
FIG. 16 shows the camera according to FIG. 13 in a plan view in section.

If no further picture is taken, and the camera is brought into the non-operating position, film gripper 76 is carried along until its grippe stop shoulder 82 and is prevented by it from moving farther. The result of this is that the snap-in connection between snap ball 78 of film gripper 76 and snap recess 79 of lens slide 18 is abolished, and the latter, released from film gripper 76, is moved into its non-operating position. Lens carrier 13 is returned via ramp 39 into its pulled-in position as shown in FIGS. 14 and 15.

When all eight frames of film strip 37 in film cassette 10 have been completely exposed, the latter is removed from body shell 12. In the process, shutter panel 26 is slid by means of pin 27 in front of exposure window 24, and the counter is set to zero. This zero position occurs by the fact that slide 80 disengages counter lever 65 and detent pawl 70 from counter bar 67 by means of hooks 74 and 75, and compression spring 69 pushes counter bar 67 back into its starting position. During this movement, with lens slide 18 in its non-operating position, detent pawl 70 penetrates with its end surface 72 into cutout 93 provided on the lens slide.

If lens slide 18 is not exactly in its taking position, end surface 72 of detent pawl 70 is not located exactly over cutout 73, but rather rests against the end surface of lens slide 18. This makes it impossible to actuate the camera.

What is claimed is:

1. A film cassette for use in a photographic camera to receive a film strip equipped with an edge perforation, comprises a flat, parallelepipedal housing with an exposure window and a film mouth, wherein configured in the housing is a circuital, continuous film channel, which film channel is adjacent to an exposure window and is open to a film mouth through which film is introduced and removed from the film cassette.

2. The film cassette as defined in claim 1, wherein the film channel comprises two straight sections running parallel to one another, having ends which are joined by means of semicircular sections.

3. The film cassette as defined in claim 1, wherein the film channel is comprised of outer walls, semicircular wall sections of the housing, and a web configured in the housing.

4. The film cassette as defined in claim 3, wherein or an outer wall on the exposure window side, at least one elongated slot extending in the direction of the film channel is present for passage of a camera-side film gripper.

5. The film cassette as defined in claim 3, wherein an outer wall on the exposure window side is equipped with a flat guideway, extending in the direction of the film channel.

6. The film cassette as defined in claim 5, wherein the flat guideway is configured as a dovetail guideway.

7. The film cassette as defined in claim 3, wherein a film pressure spring is arranged in the web in the region of the exposure window.

8. The film cassette as defined in claim 7, wherein the film pressure spring comprises a pressure plate, resting against the inside of the outer wall, from which proceed spring feet that pass through an opening in the web and are braced against a socket in the web.

9. The film cassette as defined in claim 3, wherein the film mouth is arranged in a region in which one of the semicircular wall sections meets one of the outer walls.

10. The film cassette as defined in claim 3, wherein one of the semicircular wall sections is joined to one of the outer walls of the housing and is arranged separately from an other outer wall; and wherein said one of the semicircular wall sections has a free end and rests with said free end against said one of the outer walls under elastic preload and constitutes the film mouth.

11. The film cassette as defined in claim 10, wherein said one of the semicircular wall sections is deflectable, whereby a flat transfer shoe that is U-shaped in cross-section can be slid between the respective outer wall and said one of the semicircular wall sections.

12. The film cassette as defined in claim 11, wherein said free end is wedge-shaped.

13. The film cassette as defined in claim 12, wherein the wedge-shaped free end is equipped with a flexible sealing lip.

14. The film cassette as defined in claim 12, wherein said one of the semicircular wall sections is configured as a film hinge.

15. The film cassette as defined in claim 14, characterized in that the semicircular wall section has a constriction of its cross-section in the center region of its curve.

16. The film cassette as defined in claim 1, characterized in that a spring-loaded shutter panel for the exposure window, which covers the exposure window when the film cassette is not being used, is mounted longitudinally displaceably in an outer wall on the exposure window side; and wherein the shutter panel is equipped with a pin for opening the shutter panel when the film cassette is being used in a camera to uncover the exposure window.

17. A film cassette for use in a photographic camera to receive a film strip equipped with an edge perforation, comprises a flat, parallelepipedal housing with an exposure window and a film mouth, wherein configured in the housing is a circumferential, continuous film channel extending in the longitudinal direction thereof, which film channel is adjacent to an exposure window and is open to a film mouth through which film is introduced and removed from the film cassette, wherein the film channel comprises two straight sections running parallel to one another, having ends which are joined by means of semicircular sections, and wherein the film channel is comprised of outer walls and of semicircular wall sections of the housing and a web configured in the housing.

18. The film cassette as defined in claim 17, wherein or an outer wall on the exposure window side, at least one elongated slot extending in the direction of the film channel is present for passage of a camera-side film gripper.

19. The film cassette as defined in claim 17, wherein an outer wall on the exposure window side is equipped with a flat guideway, extending in the direction of the film channel.

20. The film cassette as defined in claim 19, wherein the flat guideway is configured as a dovetail guideway.

* * * * *